Feb. 17, 1931.   D. CARTER   1,793,358
RADIATOR DRAINING DEVICE FOR MOTOR VEHICLES
Filed June 11, 1929
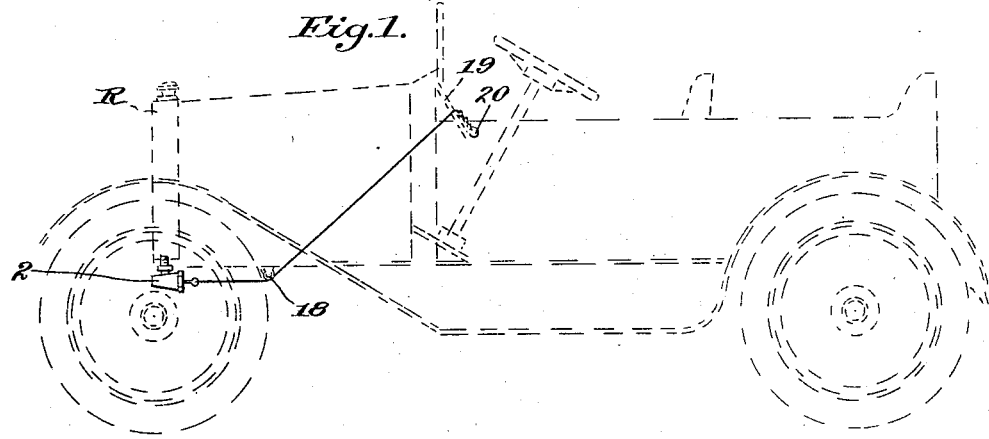
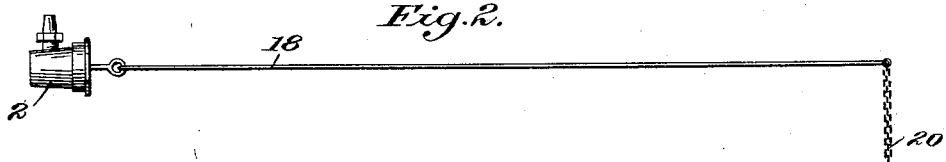
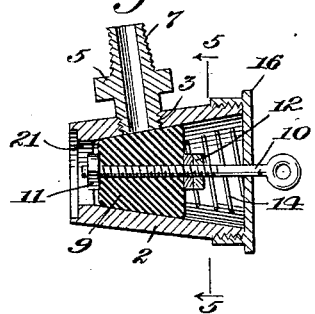 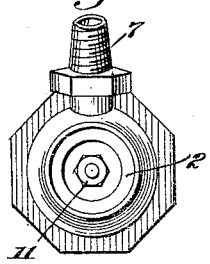 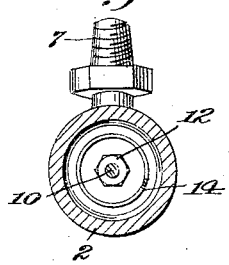
Inventor:
Dick Carter,
by Mason & Mason, Attys.

Patented Feb. 17, 1931

1,793,358

UNITED STATES PATENT OFFICE

DICK CARTER, OF COLORADO, TEXAS

RADIATOR-DRAINING DEVICE FOR MOTOR VEHICLES

Application filed June 11, 1929. Serial No. 369,989.

This invention relates to a device for draining the circulating water from the radiators of motor vehicles.

The invention comprises, as an important feature, a simple device which is attached to the radiator and in communication with its water circulating system, and at a low point of the radiator, with controlling means extending therefrom to the instrument board of the car or other convenient position for operation. In the use of the device it is merely necessary for the operator to exert a pull upon a handle, or other manipulating means, so that the radiator may be drained of its circulating water by the operator of the motor vehicle without necessitating his leaving his seat.

Other features of the invention such as important structural details and combinations of parts will be more fully described hereinafter and the novel elements will be pointed out in the appended claim.

Referring to the accompanying drawings which show a preferred embodiment of the invention, Fig. 1 illustrates the device applied to a motor vehicle, the latter being shown in dotted lines; Fig. 2 is a detail view showing the parts of the device in side elevation; Fig. 3 is a view in vertical section, somewhat enlarged, of the radiator drain valve; Fig. 4 is an elevation thereof, looking to the left of Fig. 3; and Fig. 5 is a transverse section on the line 5—5, Fig. 3.

The device as herein shown comprises a valve casing 2, of truncated conical form, having a threaded aperture 3 in one side thereof to receive a nipple 5, having at one end threads to engage the aperture 3 in the valve casing and at its opposite end provided with threads 7 which are screwed into a threaded aperture at a low point in the radiator R, so as to be in free communication with the contents of said radiator.

A valve 9, which may be of rubber, or any suitable material which is fitted to and will accurately seat within the conical bore of the valve casing 2, is located within said casing. A valve stem 10, provided exteriorly with a screw thread and extending through a central aperture of the valve 9, is clamped firmly to said valve by nuts 11, and 12, which are respectively applied to the bottom and top portion of the valve, and a spiral spring 14 is confined between the top of the valve 2, and a screw cap 16 which is herein shown as threaded to the exterior enlarged end portion of the valve casing, 2. A rod, wire, or other suitable flexible connection 18, is connected at one end with the valve stem 10 and passes thence rearwardly and upwardly finally emerging through an opening on the instrument board 19, an end of the connection 18 being herein shown as supplied with a short chain 20 to serve as an operating handle or means which is readily accessible to a person sitting within the car.

In the operation of the device, when it is desired to drain the radiator, as for example in cold weather to prevent freezing, instead of the old way of reaching down beneath the radiator, or through the mechanism in the front of the car, which necessitates the driver leaving his seat, with this device it is merely necessary to pull upon the chain 20, or other operating device, whereupon the valve 9 will be unseated and the water contained within the radiator will drain out through the nipple 7 and discharge opening 21 of the valve casing. By this device it will accordingly be seen that the necessity for soiling the hands or garments by resorting to the old practice of reaching down below the radiator or beneath the same and frequently having to use a wrench to unseat the radiator drain valve, is obviated.

Changes may be made in the details of construction or the arrangement of parts shown without departing from the spirit of the invention, provided such changes are within the scope of the following claim.

I claim:

In a radiator drain valve, the combination with a conical valve casing provided at its smaller end with a free discharge opening, an inlet port to said casing, a nipple in threaded engagement with said inlet port, and adapted for connection to the low point of a radiator, an elastic conical plug valve fitting said casing, a stem passing through said valve and clamped thereto, the outer end of said stem extending through an aperture in a cap threaded to the casing, a spiral spring confined between said cap and valve, and a flexible connection comprising a wire and chain, having connection with said stem and arranged to extend through the instrument board for operation to drain the radiator.

In testimony whereof I have hereunto set my hand this 6th day of June A. D. 1929.

DICK CARTER.